United States Patent
Katsuno et al.

(10) Patent No.: US 9,979,779 B2
(45) Date of Patent: May 22, 2018

(54) SCHEDULING SOFTWARE DEPLOYMENT

(71) Applicant: International Business Machines Corporation, Armonk, NY (US)

(72) Inventors: Yasuharu Katsuno, Kanagawa (JP); Hitomi Takahashi, Tokyo (JP); Naohiko Uramoto, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 105 days.

(21) Appl. No.: 14/830,706

(22) Filed: Aug. 19, 2015

(65) Prior Publication Data

US 2017/0054798 A1    Feb. 23, 2017

(51) Int. Cl.
    *G06F 15/16*     (2006.01)
    *H04L 29/08*     (2006.01)
    *G06F 9/48*     (2006.01)
    *G06F 9/445*     (2018.01)

(52) U.S. Cl.
    CPC ............ *H04L 67/1008* (2013.01); *G06F 8/60* (2013.01); *G06F 9/4881* (2013.01); *H04L 67/34* (2013.01)

(58) Field of Classification Search
    CPC ..... G06F 8/60; G06F 9/4881; H04L 67/1008; H04L 67/34
    USPC ........................................................ 709/203
    See application file for complete search history.

(56) References Cited

U.S. PATENT DOCUMENTS

| | | | |
|---|---|---|---|
| 7,926,051 B2 | 4/2011 | Barta et al. | |
| 8,380,760 B2 | 2/2013 | Johnson et al. | |
| 8,793,684 B2 | 7/2014 | Breitgand et al. | |
| 2007/0067329 A1* | 3/2007 | Kamvar | G06F 17/30864 |
| 2013/0086235 A1* | 4/2013 | Ferris | G06F 9/505 709/223 |
| 2013/0232498 A1* | 9/2013 | Mangtani | G06F 9/5072 718/104 |
| 2014/0281704 A1 | 9/2014 | Jacobson et al. | |

FOREIGN PATENT DOCUMENTS

WO    WO 2014/145777 A1    9/2014

OTHER PUBLICATIONS

Karthik Subramanian, "Deploying Multiple Applications in Parallel to Improve the Installation Performance," IP.com Disclosure No. IPCOM000233980D Publication Date: Jan. 6, 2014.

Jose Luis Lucas-Simarro et al., "Scheduling Strategies for Optimal Service Deployment Across Multiple Clouds," Future Generation Computer Systems, vol. 29, Issue 6, Aug. 2013, pp. 1431-1441.

* cited by examiner

*Primary Examiner* — Normin Abedin
(74) *Attorney, Agent, or Firm* — Vazken Alexanian; Michael J. Chang, LLC

(57) ABSTRACT

A method for scheduling a deployment in a first server and a second server identifies a succeeding task out of tasks deployed in the first server. The succeeding task is a task required to wait for an end of a preceding task. The preceding task is one of tasks deployed in the second server. The method sets a wait task in a process of the deployment in the first server. The wait task is a task to wait for an execution timing of the succeeding task. The method decides an execution timing of the wait task on a basis of an overlapping time of a first download task and a second download task. The first download task is one of the tasks deployed in the first server. The second download task is one of the tasks deployed in the second server.

13 Claims, 15 Drawing Sheets

SCHEDULING SOFTWARE DEPLOYMENT

BACKGROUND

The present invention relates to a method for scheduling a software deployment process, and more specifically, to a method for scheduling an automatic software deployment process using network monitoring information.

Recently, various techniques have been known to provide services through the Internet.

SUMMARY

According to an embodiment of the present invention, there is provided a method for scheduling a deployment in a first server and a second server. The method identifies a succeeding task out of tasks deployed in the first server. The succeeding task is a task required to wait for an end of a preceding task. The preceding task is one of tasks deployed in the second server. The method sets a wait task in a process of the deployment in the first server. The wait task is a task to wait for an execution timing of the succeeding task. The method decides an execution timing of the wait task on a basis of an overlapping time of a first download task and a second download task. The first download task is one of the tasks deployed in the first server. The second download task is one of the tasks deployed in the second server.

According to another embodiment of the present invention, there is provided a system for scheduling a deployment in a first server and a second server. The system includes an identifying unit, a setting unit, and a deciding unit. The identifying unit is configured to identify a succeeding task out of tasks deployed in the first server. The succeeding task has dependency on a preceding task so as to wait for an end of the preceding task. The preceding task is one of tasks deployed in the second server. The setting unit is configured to set an execution timing of the succeeding task in a process of the deployment in the first server. The deciding unit is configured to decide an execution timing of the tasks deployed in the first server while maintaining the dependency on a basis of an overlapping time of a first download task and a second download task. The first download task is one of the tasks deployed in the first server. The second download task is one of the tasks deployed in the second server.

According to still another embodiment of the present invention, there is provided a computer program product for scheduling a deployment in a first server and a second server. The computer program product includes a computer readable storage medium having program instructions embodied with the computer readable storage medium. The program instructions are executable by a computer to cause the computer to identify a succeeding task out of tasks deployed in the first server. The succeeding task is a task required to wait for an end of a preceding task. The preceding task is one of tasks deployed in the second server. The program instructions are executable by the computer to cause the computer to set a wait task in a process of the deployment in the first server. The wait task is a task to wait for an execution timing of the succeeding task. The program instructions are executable by the computer to cause the computer to execute at least one of the tasks deployed in the second server in parallel with at least one of the tasks deployed in the first server. The program instructions are executable by the computer to cause the computer to decide an execution timing of the wait task on a basis of an overlapping time of a first download task and a second download task. The first download task is one of the tasks deployed in the first server. The second download task is one of the tasks deployed in the second server.

DETAILED DESCRIPTION

Figure 1:
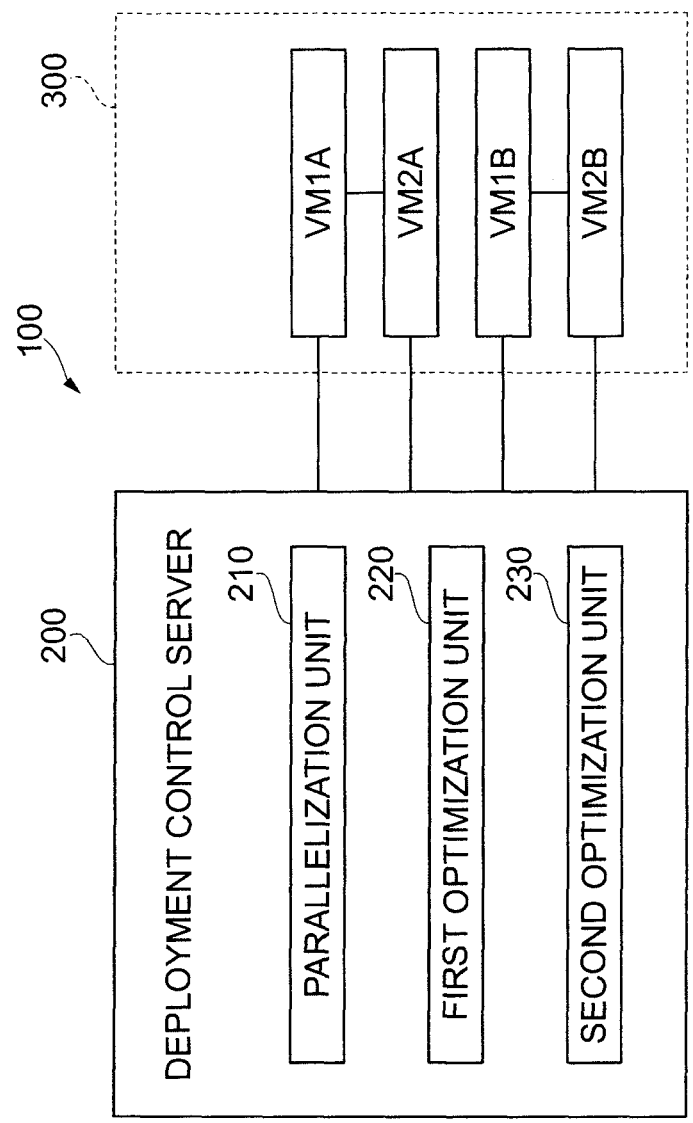
FIG. 1 is a block diagram of a deployment control system according to an embodiment.

Hereinafter, exemplary embodiments of the present invention will be described in detail with reference to the attached drawings.

It is to be noted that the present invention is not limited to these exemplary embodiments given below and may be implemented with various modifications within the scope of the present invention. In addition, the drawings used herein are for purposes of illustration.

Infrastructure as a Service (IaaS) has been known as a service provided through the Internet. IaaS may provide an infrastructure, such as physical or virtual servers, which is required to operate an information system.

Deployment in the virtual infrastructure may be automatically executed by an auto deployment tool. The deployment in the virtual infrastructure may include provision and configuration of virtual machines, and installation of software on the virtual machines. Examples of such an auto deployment tool include "OpenStack Heat" or "Chef."

Deployment of a large-scale application, also called a "Solution," may be complicated because large-scale applications require integration of multiple servers. Further, some of the servers may have mutual dependencies. It is to be noted that the architecture for integrating multiple servers may be a server/client model.

Hereinafter, the deployment of different software applications in multiple servers will be described. The time required for the deployment is generally shortened by deploying software applications to each server in parallel. However, such parallel deployment is not appropriate for some types of software applications due to the dependencies among the servers. For example, the first software application may be a database, and the second software application may be a web application utilizing the database. In this case, the parallel deployment is not appropriate because the first software application and the second software application require deployment sequentially in this order. More specifically, the first software application (the database) is first deployed in a database server. After that, the second software application (the web application) is deployed in a web server.

Hereinafter, dependencies among such multiple software applications will be described with reference to the above example. The deployment process of a software application in the database server and the web server may be divided into multiple tasks (segments), in other words, each of the deployment processes consists of multiple tasks. For example, the deployment in the database server includes three tasks: Task A1, Task A2, and Task A3 in this order. The deployment in the web server includes four tasks: Task B1, Task B2, Task B3, and Task B4 in this order. In this example, some of the tasks have mutual dependencies; Task B2 requires to be executed after the execution of Task A2, and Task B4 requires to be executed after the execution of Task A3. Task A1 and Task B1 may be executed in parallel. Upon completion of Task A2, Task A3 may be executed in parallel with Task B2.

Dividing the deployment process into multiple tasks allows the tasks to be executed in parallel. However, if the parallelly executed tasks are download tasks that overlap with each other, i.e., that are concurrently executed, the time required for the download tasks may be lengthened due to increased network traffic. In other words, a duplication time (overlapping time) of the download tasks may extend the overall deployment time. In the present embodiment, the download tasks are thus executed at mutually different timings, which will be described later.

FIG. 1 is a block diagram of a deployment control system 100 according to the embodiment. The deployment control system 100 may include a deployment control server 200 and multiple virtual machines (VMs) 300.

The deployment control server 200 may include a parallelization unit 210, a first optimization unit 220, and a second optimization unit 230. These control blocks are performed by a central processing unit (CPU).

The parallelization unit 210, as an example of the indentifying unit and setting unit, parallelizes the deployment schedule. More specifically, the parallelization unit 210 identifies dependencies among the tasks by network monitoring, which will be described later. The parallelization unit 210 also allocates a synchronization point and WAIT time (WAIT task) to the deployment schedule (deployment order).

The first optimization unit 220, as an example of the deciding unit, optimizes the deployment schedule. More specifically, the first optimization unit 220 allocates WAIT time to the deployment schedule. In other words, the first optimization unit 220 uses WAIT time for the download tasks.

The second optimization unit 230 further optimizes the deployment schedule. More specifically, the second optimization unit 230 schedules the VMs 300 in the order of descending priorities excluding the highest priority VM and then schedules the highest priority VM.

The VMs 300 may include: VM1A, VM2A, VM1B, and VM2B. VM2A as an example of the second server is functionally dependent on VM1A as an example of the first server. In other words, VM2A utilizes the function of VM1A. VM2B as an example of the fourth server is also functionally dependent on VM1B as an example of the third server. In other words, VM2B utilizes the function of VM1B.

VM1A and VM1B are configured with the same parameters. More specifically, VM1A and VM1B are provided with the same memory and CPU. Likewise, VM2A and VM2B are configured with the same parameters. More specifically, VM2A and VM2B are provided with the same memory and CPU. The network between the deployment control server 200 and VM1A, and the network between the deployment control server 200 and VM1B are configured with the same parameters. The network between the deployment control server 200 and VM2A, and the network between the deployment control server 200 and VM2B are configured with the same parameters. It is assumed that the performance of each VM is the same in a public cloud if the parameters of the VMs are the same, i.e., the VMs are composed of the same memory and CPU as mentioned above, and are connected with the same network.

The deployment control server 200 may exist on-premises or off-premises. The deployment control server 200 and the VMs 300 may be connected through any type of network, such as a local area network (LAN), a general wide area network (WAN) or a public network (e.g., the Internet).

In this embodiment, VM1A, VM2A, VM1B, and VM2B are configured as virtual machines. However, each of VM1A, VM2A, VM1B, and VM2B, may be configured as a physical machine.

Figure 2:
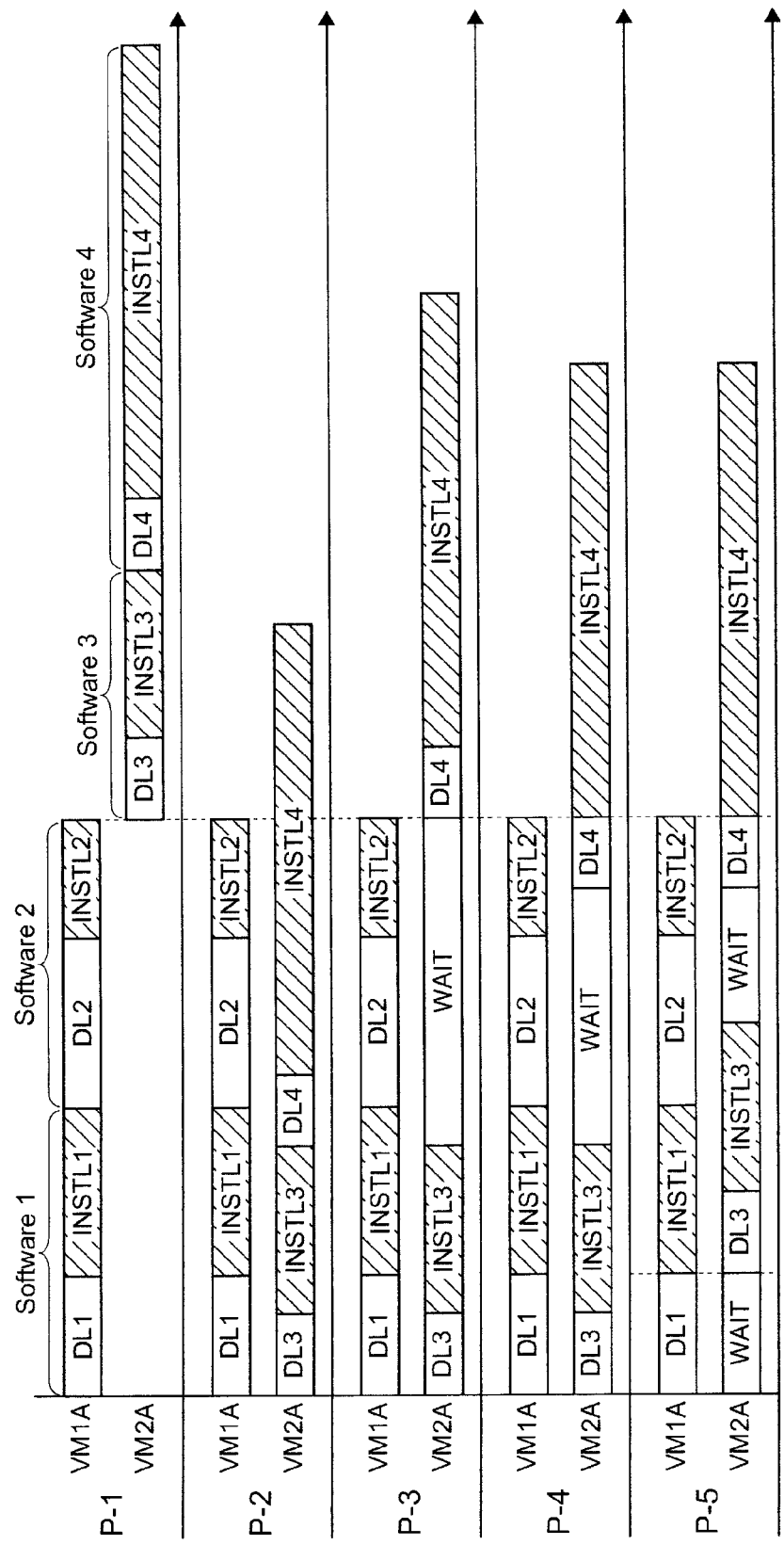
FIG. 2 is a timing chart of the operation of the deployment control server according to the embodiment.

FIG. 2 is a timing chart of the operation of the deployment control server 200 according to the embodiment. As shown in the figure, the deployment control server 200 deploys software 1, software 2, software 3, and software 4 in VM1A and VM2A. More specifically, the deployment control server 200 deploys software 1 and software 2 in VM1A, and deploys software 3 and software 4 in VM2A. It is to be noted that the deployment schedule may be described by a script, which is a small non-compiled program written for a scripting language or command interpreter.

In this embodiment, the deployment control server 200 divides the deployment script into a download script and an installation script for each software (software 1, software 2, software 3, and software 4). Each divided script part is hereinafter referred to as a "task." More specifically, deployment of the software 1 is divided into two tasks, Download 1 (DL1) and Install 1 (INSTL1). Likewise, deployment of the software 2 is divided into Download 2 (DL2) and Install 2 (INSTL2), deployment of the software 3 is divided into Download 3 (DL3) and Install 3 (INSTL3), and deployment of the software 4 is divided into Download 4 (DL4) and Install 4 (INSTL4).

The deployment control server 200 also defines priority between the VMs 300 (VM1A and VM2A). The priority is defined based on the order of the sequential deployment of the software 1 to 4 in the corresponding servers (VM1B and VM2B), which has been executed by the deployment control server 200. In other words, the deployment control server 200 defines the priority by monitoring the sequential deployment. In this example, VM1B is deployed earlier than VM2B in the sequential deployment, so that VM1A is defined as having higher priority than VM2A.

The deployment control server 200 also acquires an execution time of each task as a profile and identifies the dependencies among the tasks by monitoring the sequential deployment. The term "execution time" means a run duration from start to end of the installation process. The term "execution timing," as used elsewhere herein means the time which an installation process is invoked. It is to be noted that the above dependencies among the tasks on multiple servers are not identified by default. To define the dependencies, the parallelization unit 210 monitors a destination port to which a source VM sends data, and a Listen port which a destination VM establishes, in the preceding sequential deployment. Through the monitoring of the sequential deployment, the parallelization unit 210 defines three dependencies: (1) dependency between the task (Task 1) which establishes the Listen port and the task (Task 2) which sends data to this Listen port (Task 1 ends its own deployment before the timing when Task 2 starts), (2) dependency that the order of installation of the software applications on a VM in the parallel deployment needs to be the same as the order of installation on the corresponding VM in the sequential deployment, (3) dependency that the download task of one software application needs to end before the installation task of the same software application. Incidentally, there is no dependency among the download tasks, and the download tasks may be executed in a random order.

Hereinafter, operation of the deployment control server 200 for scheduling the deployment will be described with reference to FIG. 2. In the example of FIG. 2, INSTL4 in VM2A starts after the end of INSTL2 in VM1A. All downloads tasks (DL1, DL2, DL3, DL4) download packages from the deployment control server 200.

P-1 is a timing chart in the sequential deployment, i.e., P-1 is the default deployment timing chart.

As shown in P-2, the deployment control server 200 parallelizes the deployment schedule. More specifically, the deployment control server 200 modifies the timings of DL3, INSTL3, DL4 and INSTL4 of VM2A so that DL3 starts concurrently with DL1 of VM1A.

As shown in P-3, the deployment control server 200 then allocates WAIT time before the task (a succeeding task, INSTL4), based on the profile of the execution time and the dependencies between the tasks. The succeeding task (INSTL4) sends data to finish the deployment of the task which establishes the server (a preceding task, INSTL2) before the succeeding task (INSTL4) starts.

As shown in P-4, the deployment control server 200 then uses a part of WAIT time for the execution of the succeeding download tasks (DL4) to the extent that the duplication time of the download tasks (DL4 and DL2) does not exceed a threshold.

As shown in P-5, the deployment control server 200 then reduces the duplication time of the download tasks by changing the order of the download tasks, independently to WAIT time.

In the example, the timing charts of P-2 and P-3 correspond to the parallelization executed by the parallelization unit 210, P-4 corresponds to the first optimization executed by the first optimization unit 220, and P-5 corresponds to the second optimization executed by the second optimization unit 230.

The deployment control server 200 parallelizes and optimizes the deployment schedule, so that the deployment time is reduced. In other words, the deployment control server 200 sets WAIT time before the succeeding task so as to execute the multiple download tasks at mutually different timings.

Figure 3:
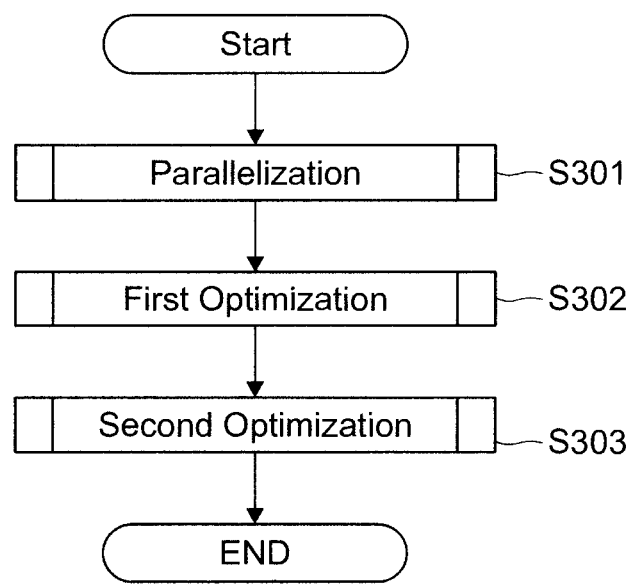
FIG. 3 is a flowchart of the operation of the deployment control server according to the embodiment.

FIG. 3 is a flowchart of the operation of the deployment control server 200 according to the embodiment.

The parallelization unit 210 in the deployment control server 200 executes the parallelization of the deployment schedule (step 301). The first optimization unit 220 then executes the first optimization of the deployment schedule (step 302). The second optimization unit 230 then executes the second optimization of the deployment schedule (step 303).

The deployment control server 200 (the parallelization unit 210) performs the parallelization of the deployment schedule so as not to violate the dependencies among the multiple VMs. In this algorithm, the multiple VMs avoids downloading the software from the same repository server (the deployment control server) at the same time, and WAIT time for the synchronization among the multiple VMs becomes minimum, based on the information of the execution time acquired through the network monitoring in the sequential deployment.

Figure 4:
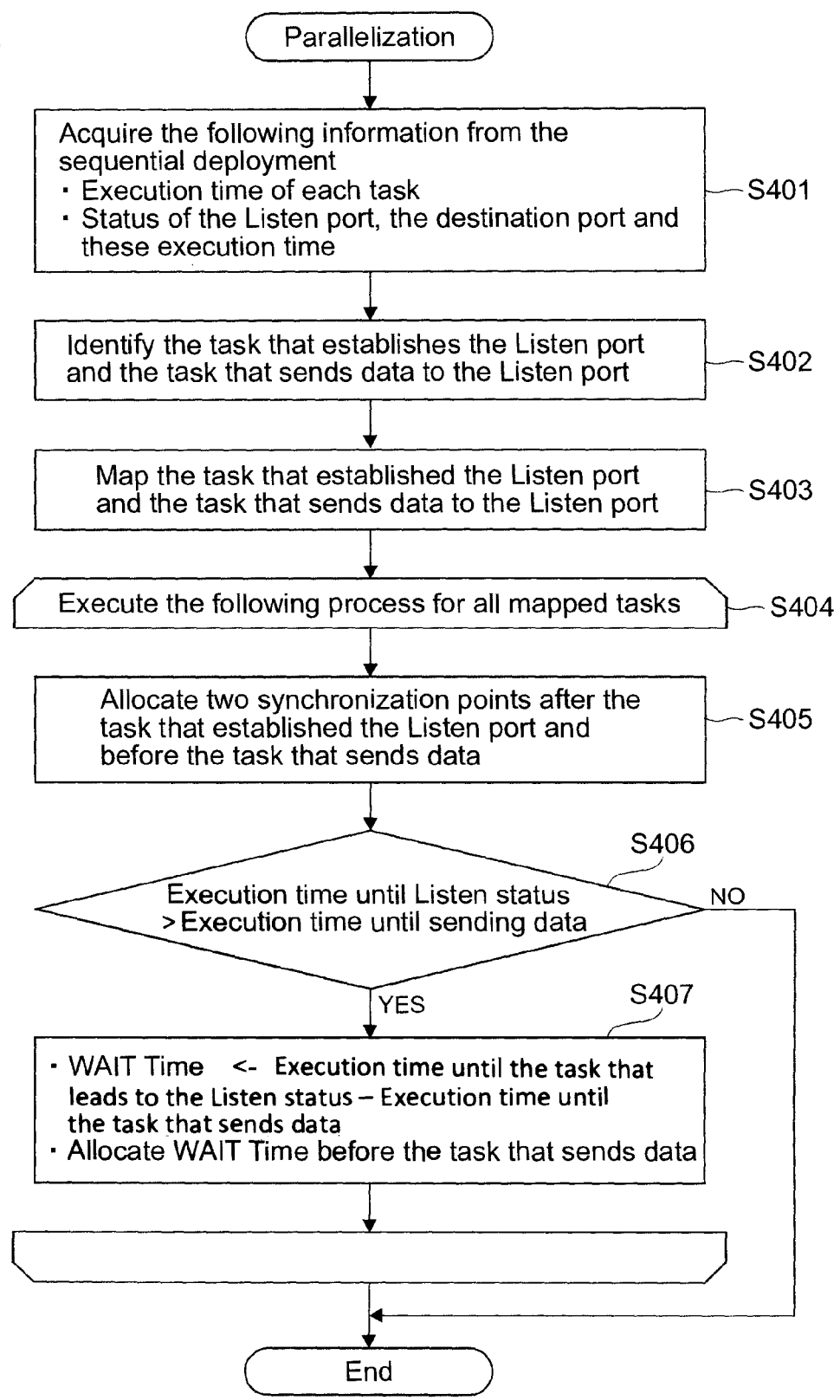
FIG. 4 is a flowchart of the parallelization.

FIG. 4 is a flowchart of the parallelization according to the embodiment.

In the parallelization of the deployment schedule, the parallelization unit 210 first acquires the following information from the sequential deployment: (1) the execution time of each task, (2) the status of the Listen port and the destination port, and their execution time (step 401).

The parallelization unit 210 then identifies the task that establishes the Listen port, and the task that sends data to the established Listen port (step 402). The parallelization unit 210 then maps the task that established the Listen port, and the task that sends data to the established port (step 403).

The parallelization unit 210 then executes the following process (from step 405 to step 407) for all mapped tasks (step 404). The parallelization unit 210 allocates two synchronization points after the task that established the Listen port, and before the task that sends data (step 405). The parallelization unit 210 then determines whether the execution time until the Listen status is less than the execution time until sending data (step 406). If the execution time until the Listen status is more than the execution time until sending data (Yes in step 406), the parallelization unit 210 sets a WAIT time to the execution time until the task that sends data minus the execution time until the task that leads to the Listen status (i.e., set a Wait time to the difference time between the finish time of the task which installs the server software to establish Listen port and the start time of the task which installs the client to send the data to this server), and allocates the WAIT time before the task that sends data (step 407).

Figure 5:
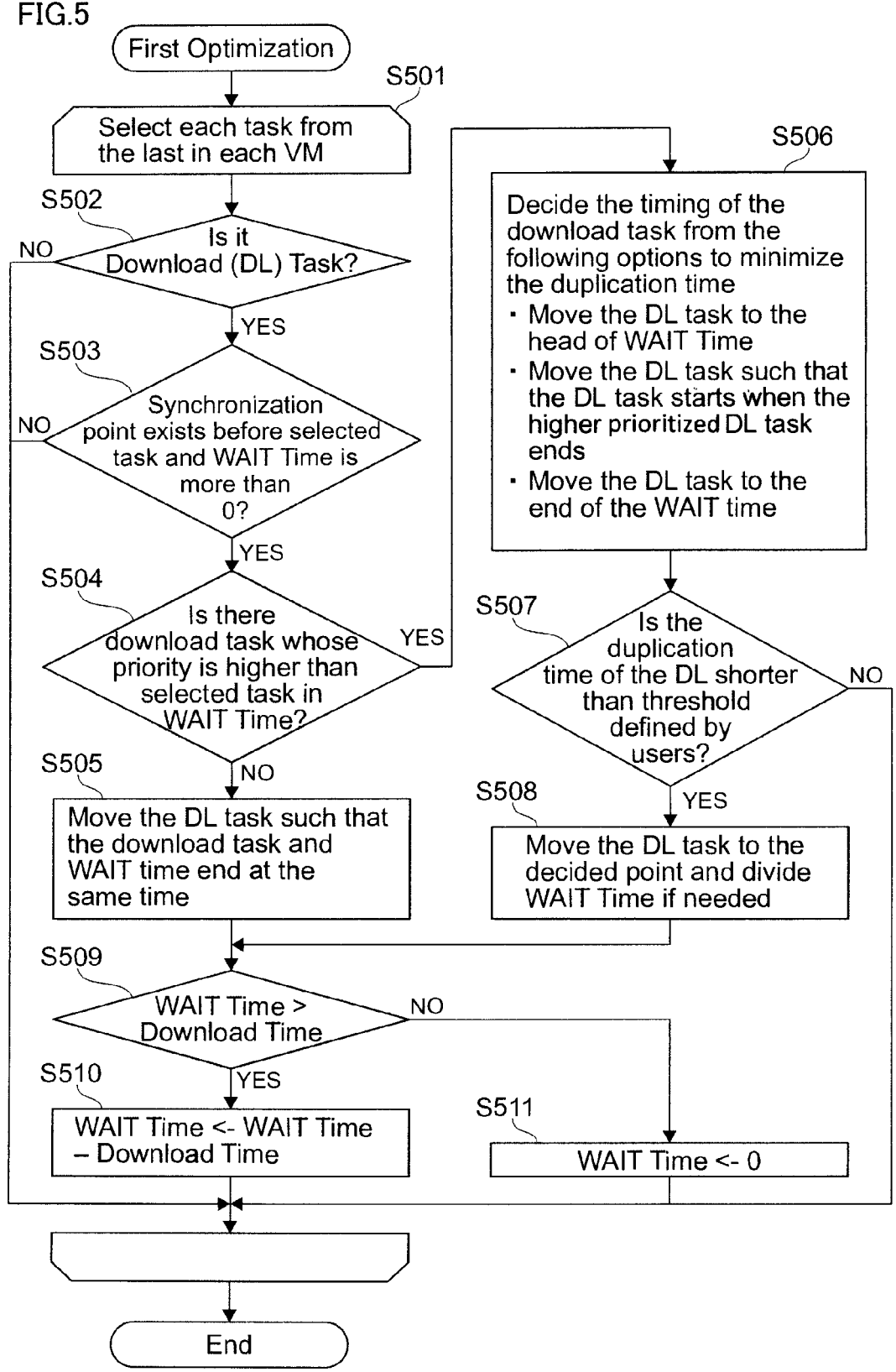
FIG. 5 is a flowchart of the first optimization.

FIG. 5 is a flowchart of the first optimization according to the embodiment.

In the first optimization of the deployment schedule, the first optimization unit 220 first selects each task from the last (i.e., the task whose order of execution is later than the others) in each VM (step 501). In this step the first optimization unit 220 gets each task from the end of the deployment task.

The first optimization unit 220 determines whether the selected task is the download task (step 502). If the selected task is the download task (Yes in step 502), the first optimization unit 220 determines whether the synchronization point exists before the selected task and WAIT time is more than zero. If the synchronization point exists before the selected task and WAIT time is more than zero (Yes in step 503), the first optimization unit 220 determines whether there is a download task whose priority is higher than the selected task in WAIT time (step 504). If there is not a download task whose priority is higher than the selected task in WAIT time (No in step 504), the first optimization unit 220 moves the download task (the selected task) such that the download task and WAIT time end at the same time, i.e., the end timings of the download task and the WAIT time coincide (step 505).

If there is a download task whose priority is higher than the selected task in WAIT time (Yes in step 504), the first optimization unit 220 decides the timing of the download task (step 506).

Figure 6:
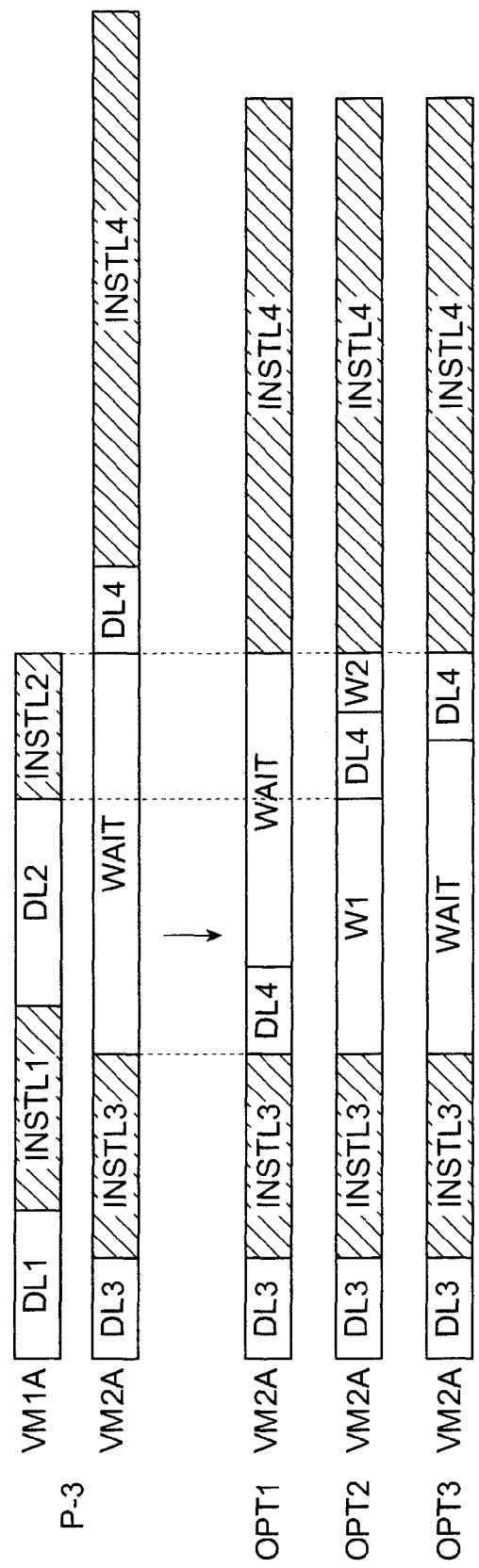
FIG. 6 is a timing chart of the operation for deciding the timing of the download task.

Hereinafter, the operation at step 506 for deciding the timing of the download task will be described in detail with reference to FIG. 6. FIG. 6 is a timing chart for deciding the timing of the download task. In this example, the first optimization unit 220 selects one option from the following scheduling options to minimize the duplication time of the download task.

Option 1 (OPT1) is to move the download task (DL4) to the head of WAIT time such that the download task (DL4) starts at the start timing of WAIT time before the first optimization. In this option, DL4 is set before WAIT time.

Option 2 (OPT2) is to move the download task (DL4) such that DL4 starts when the higher prioritized download task DL2 ends. In this option, DL4 is set between two WAIT times (W1 and W2).

Option 3 (OPT3) is to move the download task (DL4) to the end of WAIT time such that the download task (DL4) ends at the end timing of WAIT time before the first optimization. In this option, DL4 is set after WAIT time.

Returning to FIG. 5, the subsequent operation for the first optimization will be described. The first optimization unit 220 determines whether the duplication time of the download task is shorter than the threshold defined by a user (step 507). If the duplication time of the download task is shorter than the threshold defined by the user (Yes in step 507), the first optimization unit 220 moves the download task to the point decided at step 506 and divides WAIT time if needed (step 508).

The first optimization unit 220 then determines whether WAIT time is longer than the download time (step 509). If WAIT time is longer than the download time (Yes in step 509), the first optimization unit 220 sets WAIT time to WAIT time minus the download time (step 510). If WAIT time is not longer than the download time (No in step 509), the first optimization unit 220 sets WAIT time to zero (step 511).

Figure 7:
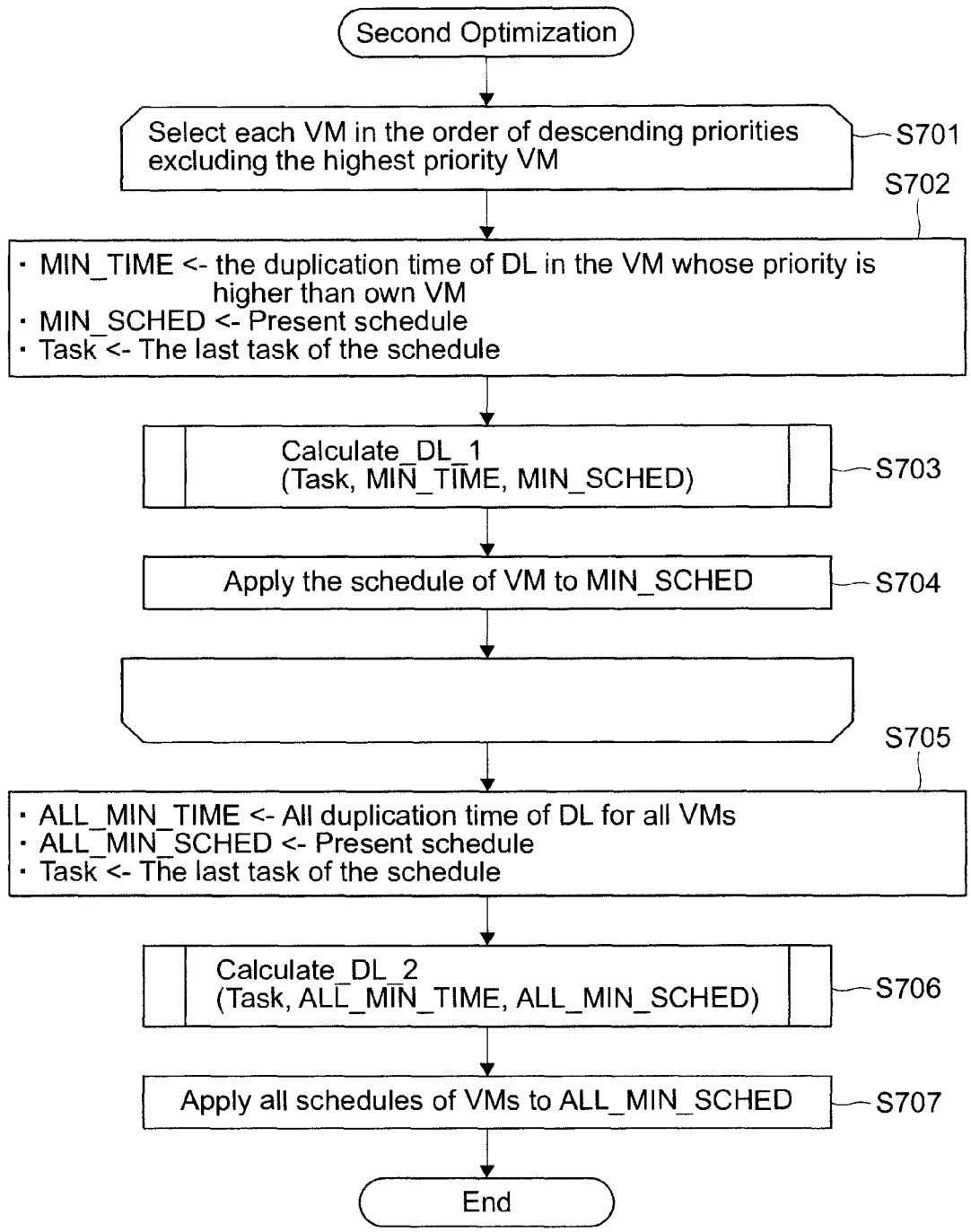
FIG. 7 is a flowchart of the second optimization.

FIG. 7 is a flowchart of the second optimization according to the embodiment.

In the second optimization of the deployment schedule, the second optimization unit 230 first selects each VM in the order of descending priorities excluding the highest priority VM (step 701). In other words, the second optimization unit 230 executes the following process (from step 702 to step 704) for all VMs excluding the highest priority VM.

The second optimization unit 230 sets MIN_TIME to the duplication time of the download task in the VM whose priority is higher than the own VM (i.e., the current value (VM) in the loop process), MIN_SCHED to the present schedule, and Task to the last task of the schedule. The second optimization unit 230 then calculates DL_1 (Task, MIN_TIME, MIN_SCHED) (step 703). The calculation of DL_1 (Task, MIN_TIME, MIN_SCHED) will be described in detail later. The second optimization unit 230 then applies the schedule of the VM to MIN_SCHED (step 704).

The second optimization unit 230 then sets ALL_MIN_TIME to all the duplication times of the download tasks for all VMs, ALL_MIN_SCHED to the present schedule, and Task to the last task of the schedule (step 705). The second optimization unit 230 then calculates DL_2 (Task, ALL_MIN_TIME, ALL_MIN_SCHED) (step 706). The calculation of DL_2 (Task, ALL_MIN_TIME, ALL_MIN_SCHED) will be described in detail later. The second optimization unit 230 then applies all schedules of all VMs to ALL_MIN_SCHED (step 707).

Figure 8:
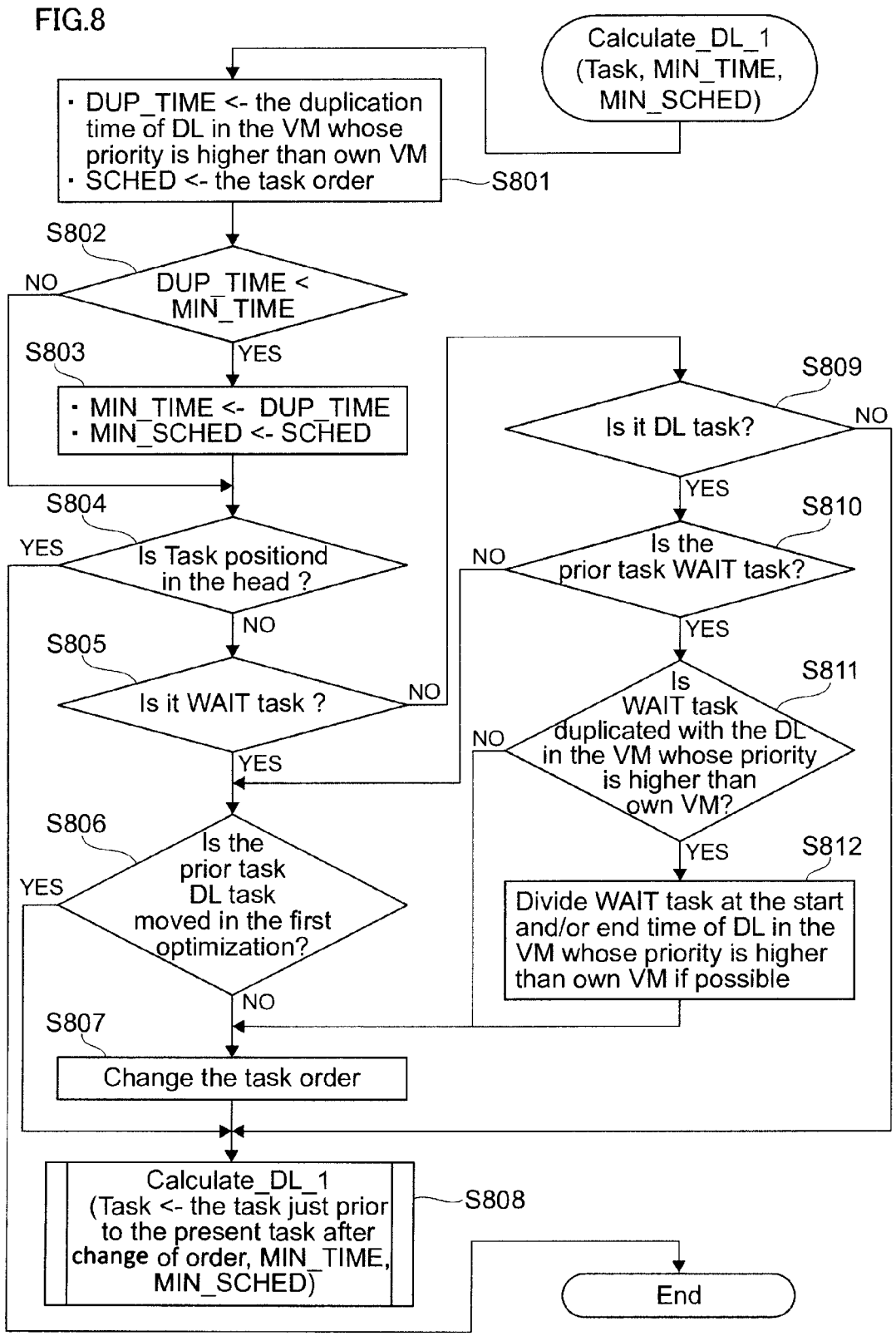
FIG. 8 is a flowchart for calculating DL_1 (Task, MIN_TIME, MIN_SCHED).

FIG. 8 is a flowchart of the operation for calculating DL_1 (Task, MIN_TIME, MIN_SCHED) according to the embodiment.

In the calculation of DL_1 (Task, MIN_TIME, MIN_SCHED), the second optimization unit 230 first sets DUP_TIME to the duplication time of the download task in the VM whose priority is higher than the own VM (i.e., the current value (VM) in the loop process), and SCHED to the present task order (step 801).

The second optimization unit 230 determines whether DUP_TIME is less than MIN_TIME (step 802). If DUP_TIME is less than MIN_TIME (Yes in step 802), the second optimization unit 230 sets MIN_TIME to DUP_TIME, and MIN_SCHED to SCHED (step 803). The second optimization unit 230 then determines whether the present task is positioned in the head (i.e., whether the present task is the first task of the deployment tasks and thus at the beginning of the deployment schedule) (step 804). If DUP_TIME is not less that MIN_TIME (No in step 802), the second optimization unit 230 moves to step 804.

If the present task is not positioned in the head (No in step 804), the second optimization unit 230 then determines whether the present task is a WAIT task (step 805). If the present task is a WAIT task (Yes in step 805), the second optimization unit 230 then determines whether the task just prior to the present task is the download task moved in the first optimization (step 806). If the task just prior to the present task is not the download task moved in the first optimization operation (No in step 806), the second optimization unit 230 then changes the task order between the present task and the task just prior to the present task (step 807). The second optimization unit 230 then calculates DL_1 (Task←the task just prior to the present task after the change of the order, MIN_TIME, MIN_SCHED) (step 808).

If the present task is not a WAIT task (No in step 805), the second optimization unit 230 then determines whether the present task is the download task (step 809). If the present task is the download task (Yes in step 809), the second optimization unit 230 then determines whether the task just prior to the present task is a WAIT task (step 810). If the task just prior to the present task is a WAIT task (Yes in step 810), the second optimization unit 230 then determines whether WAIT task just prior to the present task is duplicated with the download task in the VM whose priority is higher than the own VM (i.e., the current value (VM) in the loop process) (step 811). If the WAIT task just prior to the present task is duplicated with the download task in the VM whose priority is higher than the own VM (i.e., the current value (VM) in the loop process) (Yes in step 811), the second optimization unit 230 then divides the WAIT task (i.e., splits one Wait task into two or more tasks) at the start time and/or the end time of the download task in the VM whose priority is higher than the own VM, if possible (step 812). The second optimization unit 230 then moves to step 807.

If the task just prior to the present task is not a WAIT task (No in step 810), the second optimization unit 230 then moves to step 806.

If the WAIT task just prior to the present task is not duplicated with the download task in the VM whose priority is higher than the own VM (No in step 811), the second optimization unit 230 then moves to step 807.

Figure 9:
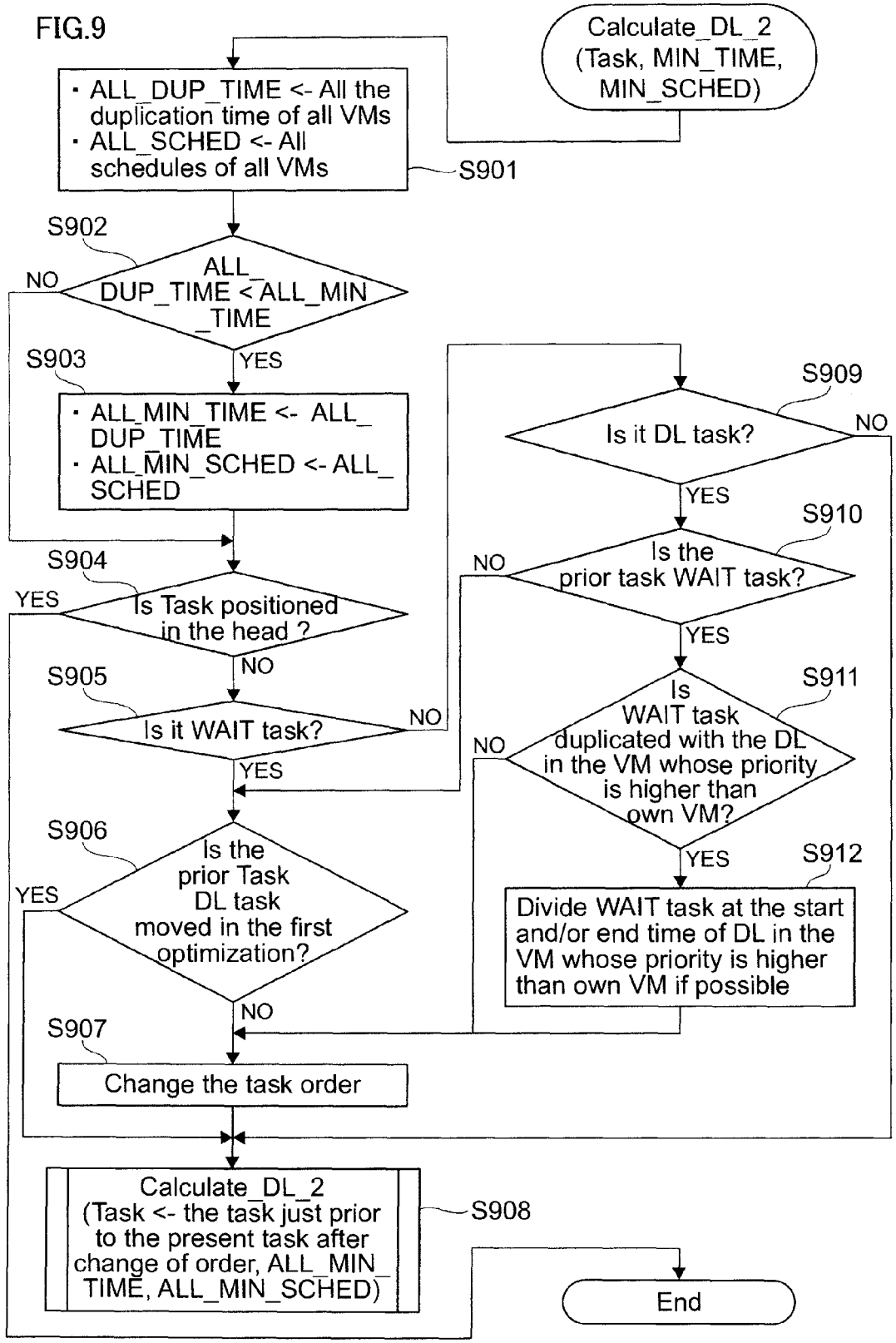
FIG. 9 is a flowchart for calculating DL_2 (Task, ALL_MIN_TIME, ALL_MIN_SCHED).

FIG. 9 is a flowchart of the operation for calculating DL_2 (Task, ALL_MIN_TIME, ALL_MIN_SCHED) according to the embodiment.

In the calculation of DL_2 (Task, ALL_MIN_TIME, ALL_MIN_SCHED), the second optimization unit 230 first sets ALL_DUP_TIME to all duplication times of all VMs, and ALL_SCHED to all schedules of all VMs (step 901).

The second optimization unit 230 determines whether ALL_DUP_TIME is less than ALL_MIN_TIME (step 902). If ALL_DUP_TIME is less than ALL_MIN_TIME (Yes in step 902), the second optimization unit 230 sets ALL_MIN_TIME to ALL_DUP_TIME, and ALL_MIN_SCHED to ALL_SCHED (step 903). The second optimization unit 230 then determines whether the present task is positioned in the head, i.e., at the beginning of the deployment schedule (step 904). If ALL_DUP_TIME is not less that ALL_MIN_TIME (No in step 902), the second optimization unit 230 moves to the above step 904.

If the present task is not positioned in the head, i.e., at the beginning of the deployment schedule (No in step 904), the second optimization unit 230 then determines whether the present task is WAIT task (step 905). If the present task is a WAIT task (Yes in step 905), the second optimization unit 230 then determines whether the task just prior to the present task is the download task moved in the first optimization (step 906). If the task just prior to the present task is not the download task moved in the first optimization operation (No in step 906), the second optimization unit 230 then changes the task order between the present task and the task just prior to the present task (step 907). The second optimization unit 230 then calculates DL_2 (Task←the task just prior to the present task after the change of the order, ALL_MIN_TIME, ALL_MIN_SCHED) (step 908).

If the present task is not a WAIT task (No in step 905), the second optimization unit 230 then determines whether the present task is the download task (step 909). If the present task is the download task (Yes in step 909), the second optimization unit 230 then determines whether the task just prior to the present task is a WAIT task (step 910). If the task just prior to the present task is a WAIT task (Yes in step 910), the second optimization unit 230 then determines whether the WAIT task just prior to the present task is duplicated with the download task in the VM whose priority is higher than the own VM (step 911). If the WAIT task just prior to the present task is duplicated with the download task in the VM whose priority is higher than the own VM (Yes in step 911), the second optimization unit 230 then divides the WAIT task at the start time and/or the end time of the download task in the VM whose priority is higher than the own VM, if possible (step 912). The second optimization unit 230 then moves to step 907.

If the task just prior to the present task is not a WAIT task (No in step 910), the second optimization unit 230 then moves to step 906.

If the WAIT task just prior to the present task is not duplicated with the download task in the VM whose priority is higher than the own VM (No in step 911), the second optimization unit 230 then moves to step 907.

As described above, in this embodiment, the deployment control server 200 is not required to wait for the human operation. In other words, the deployment control server 200 parallelizes and optimizes the deployment without requiring the human operation. This allows for the reduction or elimination of human errors.

Figure 10:
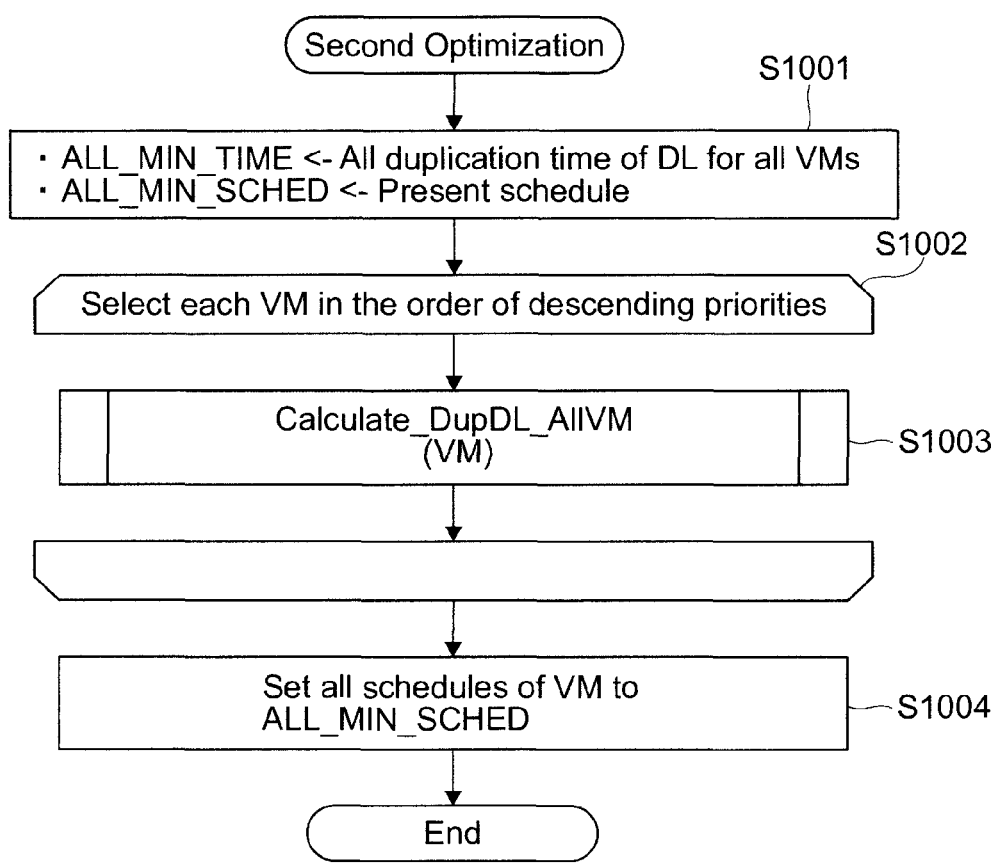
FIG. 10 is a flowchart of the second optimization according to another embodiment.
Figure 11:
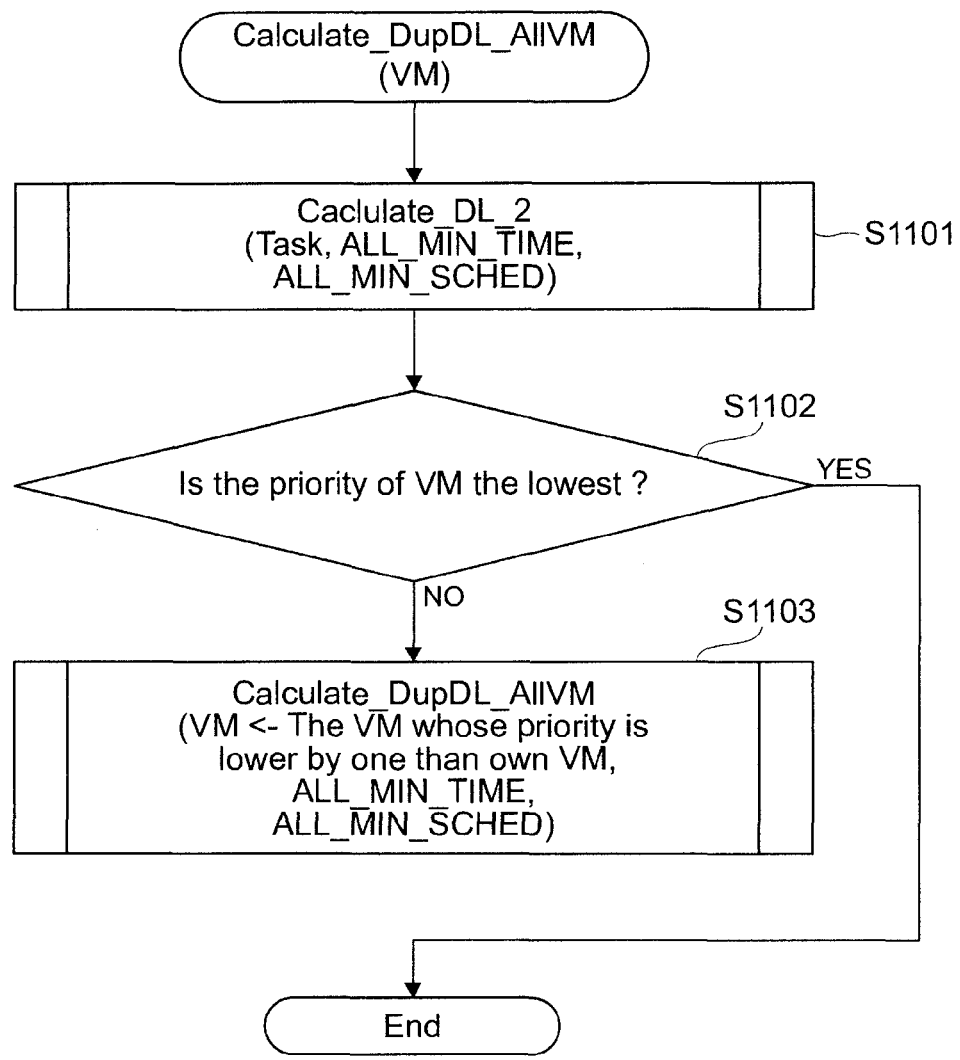
FIG. 11 is a flowchart for calculating the DupDL_AllVM (VM).

FIG. 10 is a flowchart of the second optimization according to another embodiment. FIG. 11 is a flowchart of the operation for calculating the DupDL_AllVM (VM).

Hereinafter, the operation for the second optimization according to another embodiment will be described with reference to FIG. 10 and FIG. 11. In this embodiment, the second optimization unit 230 searches for the minimum duplication time with respect to all combinations of all VMs.

More specifically, in this embodiment, the second optimization unit 230 sets ALL_MIN_TIME to all the duplication times of the download tasks of all VMs, and ALL_MIN_ SCHED to the present schedule (step 1001). The second optimization unit 230 then selects each VM in the order of descending priorities (step 1002). In other words, the second optimization unit 230 executes the following process (step 1002) for all VMs. The second optimization unit 230 calculates DupDL_AllVM (VM) (step 1003). The second optimization unit 230 then sets all schedules of VM to ALL_MIN_SCHED (step 1004).

In the calculation of DupDL_AllVM (VM), the second optimization unit 230 calculates DL_2 (Task, ALL_MIN_TIME, ALL_MIN_SCHED) (step 1101), which has been described above with reference to FIG. 9. The second optimization unit 230 then determines whether the priority of the present VM is the lowest (step 1102). If the priority of the present VM is not the lowest (No in step 1102), the second optimization unit 230 then calculates DupDL_AllVM (VM←the VM whose priority is lower by one than the own VM (i.e., the current value (VM) in the loop process), ALL_MIN_TIME, ALL_MIN_SCHED). If the priority of the present VM is the lowest (Yes in step 1102), the second optimization unit 230 ends the calculation of DupDL_AllVM (VM).

In the above description, the operation for the second optimization is described as two types of operation. The first operation is shown in FIG. 7, FIG. 8, and FIG. 9, and the second operation is shown in FIG. 9, FIG. 10, and FIG. 11. The second optimization unit 230 may be configured to selectively execute the first operation or the second operation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
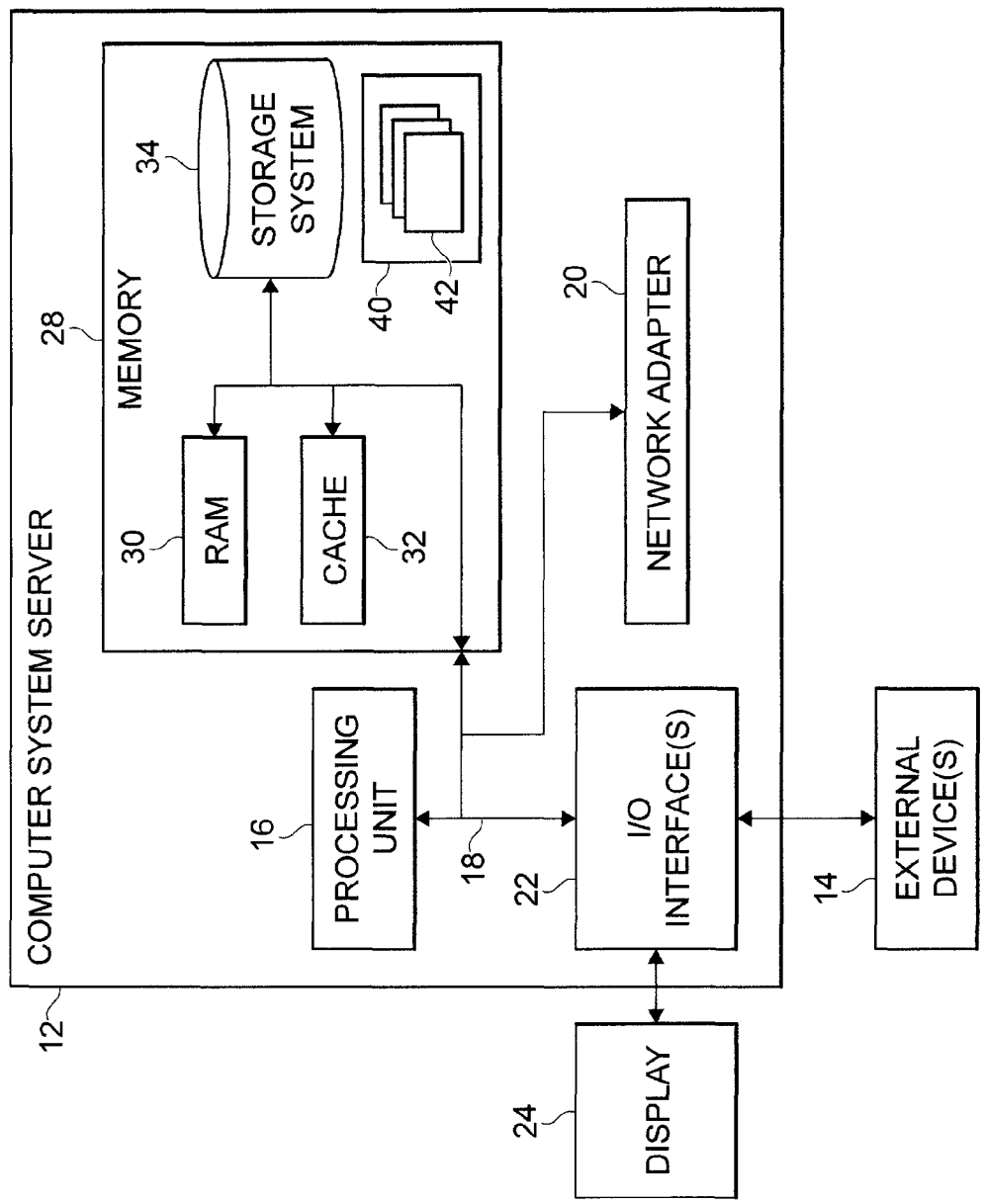
FIG. 12 depicts a cloud computing node according to an embodiment.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
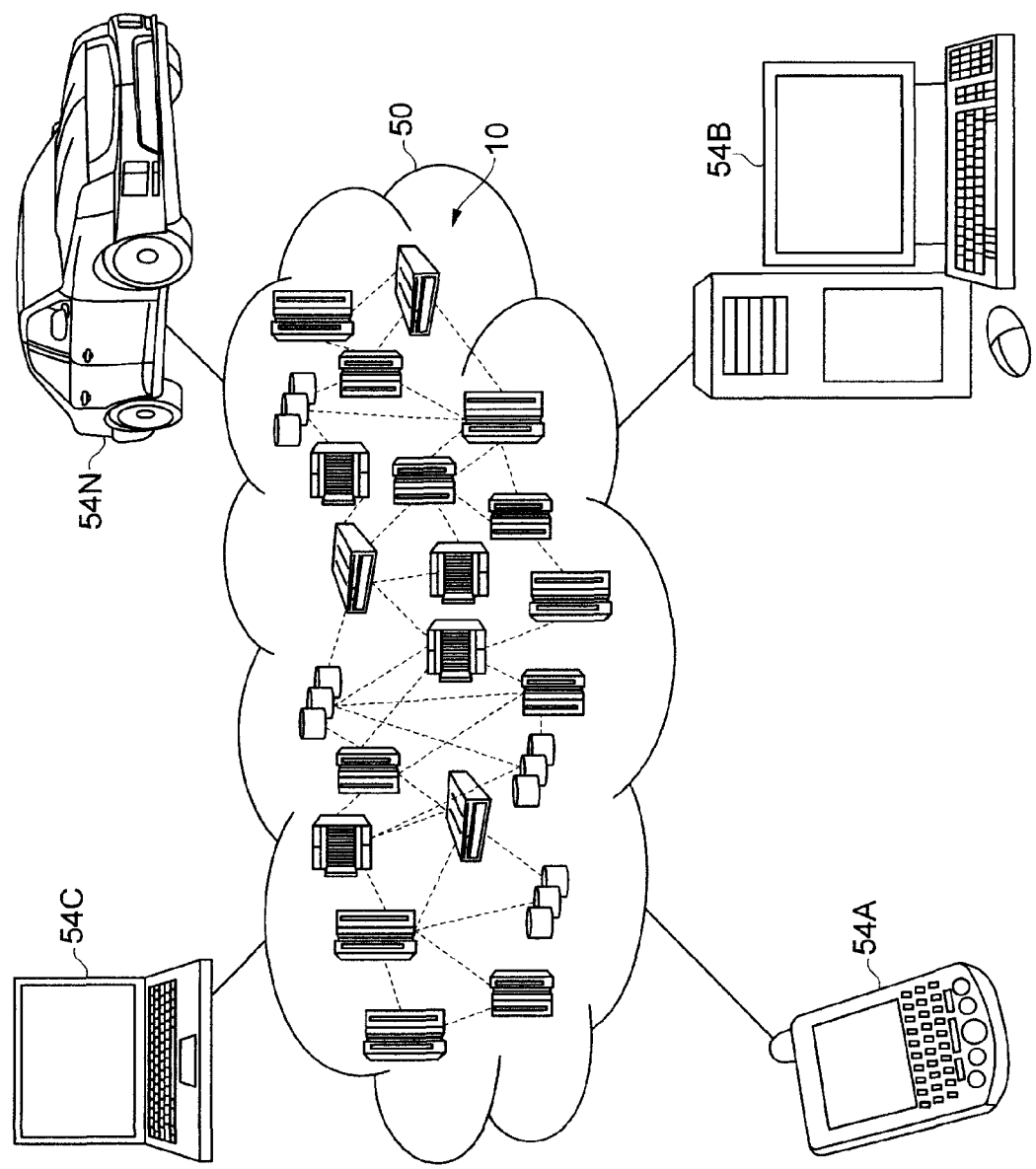
FIG. 13 depicts a cloud computing environment according to an embodiment.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
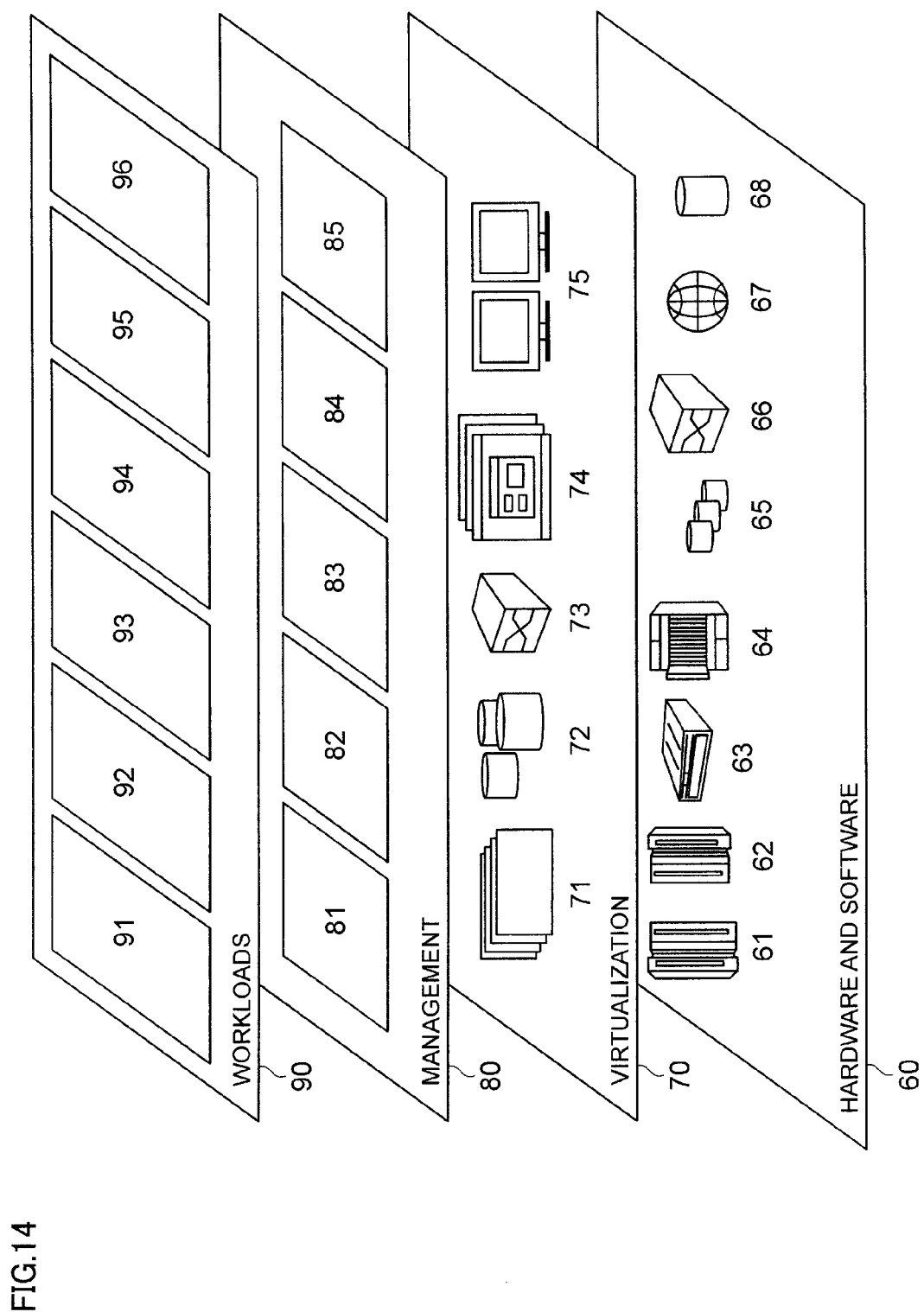
FIG. 14 depicts abstraction model layers according to an embodiment.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 15:
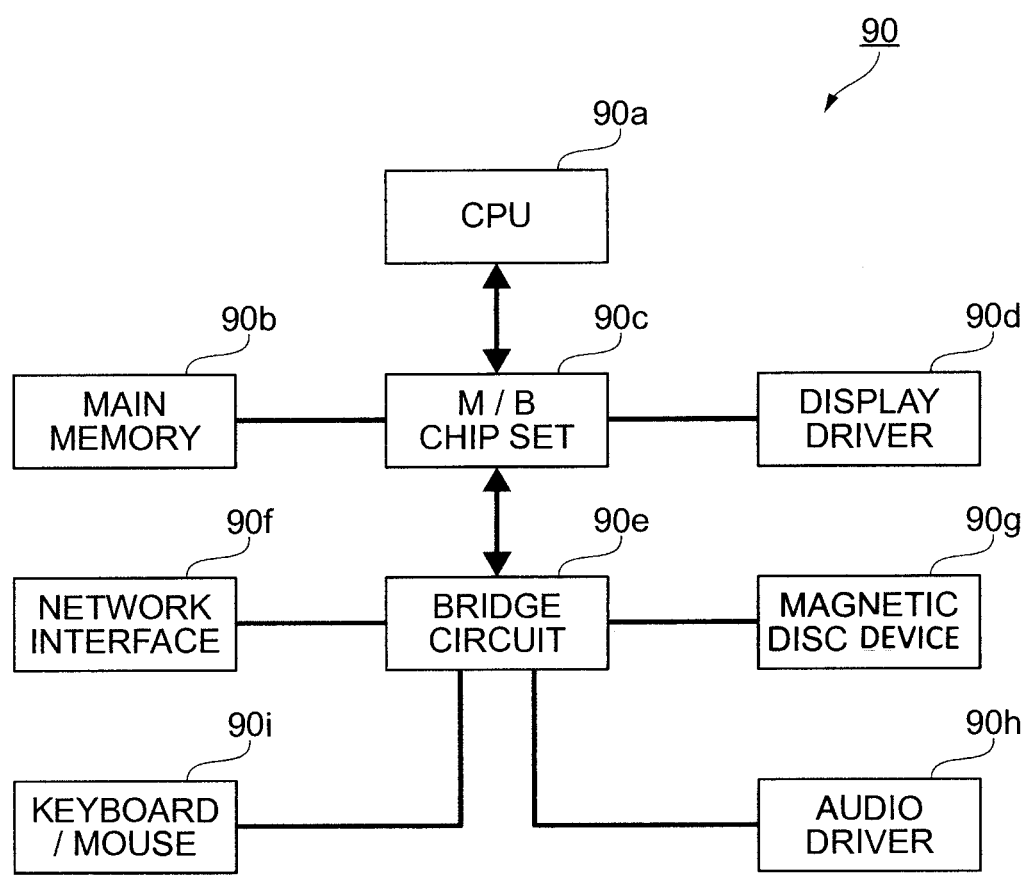
FIG. 15 is a diagram showing an example of the hardware configuration of a computer able to implement the exemplary embodiment.

In FIG. 15, a hardware configuration 90, the various elements are connected via buses. For example, the CPU 90a and the M/B chip set 90c, and the main memory 90b are connected via CPU buses, respectively. Also, the M/B chip set 90c and the display mechanism 90d may be connected via an accelerated graphics port (AGP). However, when the display mechanism 90d includes a PCI express-compatible video card, the M/B chip set 90c and the video card are connected via a PCI express (PCIe) bus. Also, when the network interface 90f is connected to the bridge circuit 90e, a PCI Express may be used for the connection, for example. For connecting the magnetic disk drives 90g to the bridge circuit 90e, a serial AT attachment (ATA), a parallel-transmission ATA, or peripheral components interconnect (PCI) may be used. For connecting the keyboard/mouse 90i or the audio driver 90h to the bridge circuit 90e, a universal serial bus (USB) may be used.

Here, the present invention may be realized using all hardware or all software. It can also be realized using a combination of both hardware and software. The present invention may also be realized as a computer, data processing system, or computer program product. The computer program product may be stored and distributed on a non-transitory computer-readable medium. Here, the medium may be an electronic, magnetic, optical, electromagnetic, infrared, or semiconductor system (device or equipment), or a transmission medium. Examples of the non-transitory computer-readable medium include semiconductors, solid-state storage devices, magnetic tape, removable computer diskettes, random-access memory (RAM), read-only memory (ROM), rigid magnetic disks, and optical disks. Examples of optical disks at the present time include compact disk read-only memory (CD-ROM) disks, compact disk read/write (CD-R/W) disks, and DVDs.

The present invention has been explained above using an exemplary embodiment, but the technical scope of the present invention is not limited in any way by this exemplary embodiment. It should be clear to a person of skill in the art that various modifications and substitutions can be made without departing from the spirit and scope of the present invention.

What is claimed is:

1. A method for scheduling a deployment in a first server and a second server, comprising:
    identifying a succeeding task out of tasks deployed in the first server, the succeeding task having a dependency on a preceding task so as being a task required to wait for an end of the preceding task, the preceding task being one of tasks deployed in the second server;
    monitoring preceding sequential deployments to automatically determine the dependency of the succeeding task on the preceding task based on the preceding task establishing a listen port and the succeeding task sending data to the listen port;
    setting a wait task in a process of the deployment in the first server, the wait task being a task to wait for an execution timing of the succeeding task;
    deciding an execution timing of the wait task on a basis of an overlapping time of a first download task and a second download task, the first download task being one of the tasks deployed in the first server, the second download task being one of the tasks deployed in the second server, wherein the preceding task and the succeeding task comprise install tasks, and wherein no dependency exists among download tasks which can be executed in any order; and
    shortening the overlapping time of the first download task and the second download task when the first download task overlaps with the second download task by changing an order of the download tasks.

2. The method of claim 1, wherein deciding the execution timing of the wait task includes adjusting the wait task so that end timings of the first download task and the preceding task coincide with each other.

3. The method of claim 1, wherein deciding the execution timing of the wait task includes changing the order of a third download task deployed in the first sever with the wait task.

4. The method of claim 1, wherein deciding the execution timing of the wait task includes dividing the wait task if a time for executing the second download task in the second server is shorter than a time for executing the wait task.

5. The method of claim 1, further comprising:
    executing at least one of the tasks deployed in the second server in parallel with at least one of the tasks deployed in the first server.

6. The method of claim 1, further comprising:
    executing a sequential deployment in a third server and a fourth server in this order; and
    identifying the succeeding task on a basis of a result of the sequential deployment.

7. A system for scheduling a deployment in a first server and a second server, comprising a memory coupled with at least one processor, the memory embodying instructions that, when executed by the at least one processor, cause the at least one processor to:
    identify a succeeding task out of tasks deployed in the first server, the succeeding task having dependency on a preceding task so as to wait for an end of the preceding task, the preceding task being one of tasks deployed in the second server;
    monitor preceding sequential deployments to automatically determine the dependency of the succeeding task on the preceding task based on the preceding task establishing a listen port and the succeeding task sending data to the listen port;
    set an execution timing of the succeeding task in a process of the deployment in the first server;
    decide an execution timing of the tasks deployed in the first server while maintaining the dependency on a basis of an overlapping time of a first download task and a second download task, the first download task being one of the tasks deployed in the first server, the second download task being one of the tasks deployed in the second server, wherein the preceding task and the succeeding task comprise install tasks, and wherein no dependency exists among download tasks which can be executed in any order; and
    shorten the overlapping time of the first download task and the second download task when the first download task overlaps with the second download task by changing an order of the download tasks.

8. A computer program product for scheduling a deployment in a first server and a second server, the computer program product comprising a non-transitory computer readable storage medium having program instructions embodied therewith, the program instructions executable by a computer to cause the computer to:
    identify a succeeding task out of tasks deployed in the first server, the succeeding task having a dependency on a preceding task so as being a task required to wait for an end of the preceding task, the preceding task being one of tasks deployed in the second server;
    monitor preceding sequential deployments to automatically determine the dependency of the succeeding task on the preceding task based on the preceding task establishing a listen port and the succeeding task sending data to the listen port;
    set a wait task in a process of the deployment in the first server, the wait task being a task to wait for an execution timing of the succeeding task; and
    decide an execution timing of the wait task on a basis of an overlapping time of a first download task and a second download task, the first download task being one of the tasks deployed in the first server, the second download task being one of the tasks deployed in the second server, wherein the preceding task and the succeeding task comprise install tasks, and wherein no dependency exists among download tasks which can be executed in any order; and
    shorten the overlapping time of the first download task and the second download task when the first download task overlaps with the second download task by changing an order of the download tasks.

9. The computer program product of claim 8, wherein deciding the execution timing of the wait task includes adjusting the wait task so that end timings of the first download task and the preceding task coincide with each other.

10. The computer program product of claim 8, wherein deciding the execution timing of the wait task includes changing the order of a third download task deployed in the first sever with the wait task.

11. The computer program product of claim 8, wherein deciding the execution timing of the wait task includes dividing the wait task if a time for executing the second download task in the second server is shorter than a time for executing the wait task.

12. The computer program product of claim 8, wherein the program instructions further cause the computer to:
   execute at least one of the tasks deployed in the second server in parallel with at least one of the tasks deployed in the first server.

13. The computer program product of claim 8, wherein the program instructions further cause the computer to:
   execute a sequential deployment in a third server and a fourth server in this order; and
   identify the succeeding task on a basis of a result of the sequential deployment.

\* \* \* \* \*